(12) United States Patent
Choi et al.

(10) Patent No.: US 8,277,204 B2
(45) Date of Patent: Oct. 2, 2012

(54) RECIPROCATING MOTOR AND A RECIPROCATING COMPRESSOR HAVING THE SAME

(75) Inventors: Jong-Yoon Choi, Seoul (KR); Kyeong-Bae Park, Seoul (KR); Ki-Chul Choi, Seoul (KR); Eon-Pyo Hong, Seoul (KR); Jin-Sung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 683 days.

(21) Appl. No.: 12/416,277

(22) Filed: Apr. 1, 2009

(65) Prior Publication Data
US 2009/0252623 A1 Oct. 8, 2009

(30) Foreign Application Priority Data
Apr. 2, 2008 (KR) .................. 10-2008-0030934

(51) Int. Cl.
*F04B 17/04* (2006.01)
*H02K 41/03* (2006.01)
*H02K 33/00* (2006.01)
(52) U.S. Cl. .................. 417/416; 310/12.16; 310/15
(58) Field of Classification Search ............... 310/12.16, 310/15; 417/416
See application file for complete search history.

(56) References Cited

U.S. PATENT DOCUMENTS

| | | |
|---|---|---|
| 3,937,904 A | 2/1976 | Parker |
| 4,346,318 A | 8/1982 | Shtrikman |
| 5,317,221 A * | 5/1994 | Kubo et al. ................ 310/12.16 |
| 6,540,485 B2 | 4/2003 | Nara et al. |
| 2005/0129540 A1 * | 6/2005 | Puff .............................. 417/416 |
| 2005/0175482 A1 * | 8/2005 | Park et al. ...................... 417/416 |
| 2006/0222532 A1 * | 10/2006 | Lee et al. ....................... 417/417 |

FOREIGN PATENT DOCUMENTS

| | | |
|---|---|---|
| CN | 1602577 A | 3/2005 |
| CN | 1625025 A | 6/2005 |

OTHER PUBLICATIONS

Chinese Office Action dated Mar. 11, 2011 issued in Application No. 200910132557.X.
Chinese Office Action dated Mar. 16, 2012.

* cited by examiner

*Primary Examiner* — Karabi Guharay
*Assistant Examiner* — Michael Santonocito
(74) *Attorney, Agent, or Firm* — KED & Associates LLP

(57) ABSTRACT

A reciprocating motor and a reciprocating compressor having the same are provided. One side of each of outer and inner cores forming a stator are connected to each other, to prevent a magnetic flux generated by the coil and a magnet from leaking out of the stator. Hence, it is possible to fabricate components of the reciprocating compressor employing such a reciprocating motor by using a relatively low-cost magnetic substance, resulting in a decrease in fabricating costs of the compressor. Also, a length of the magnet may be reduced, which results in a reduction of the cost for the magnet, thereby decreasing fabricating costs of the reciprocating motor and the reciprocating compressor employing the reciprocating motor.

28 Claims, 13 Drawing Sheets

FIG. 10

|  | Rac(Ω) | |
| --- | --- | --- |
|  | IRON LOSS OF PRESENT INVENTION | IRON LOSS OF PRIOR ART |
| Al | 15 | 15 |
| Steel | 15 | 47 |

US 8,277,204 B2

RECIPROCATING MOTOR AND A RECIPROCATING COMPRESSOR HAVING THE SAME

The present application claims priority to Korean Application No. 10-2008-0030934, filed in Korea on Apr. 2, 2008, which is herein expressly incorporated by reference in its entirety.

BACKGROUND

1. Field

A reciprocating motor and a reciprocating compressor having the same are disclosed herein.

2. Background

Reciprocating motors and reciprocating compressors are known. However, they suffer from various disadvantages.

BRIEF DESCRIPTION OF THE DRAWINGS

Embodiments will be described in detail with reference to the following drawings in which like reference numerals refer to like elements, and wherein:

FIG. 10 is a table showing comparison results of iron losses between the reciprocating motor of FIG. 3 and the reciprocating motor of FIG. 2;

DETAILED DESCRIPTION

Figure 1:
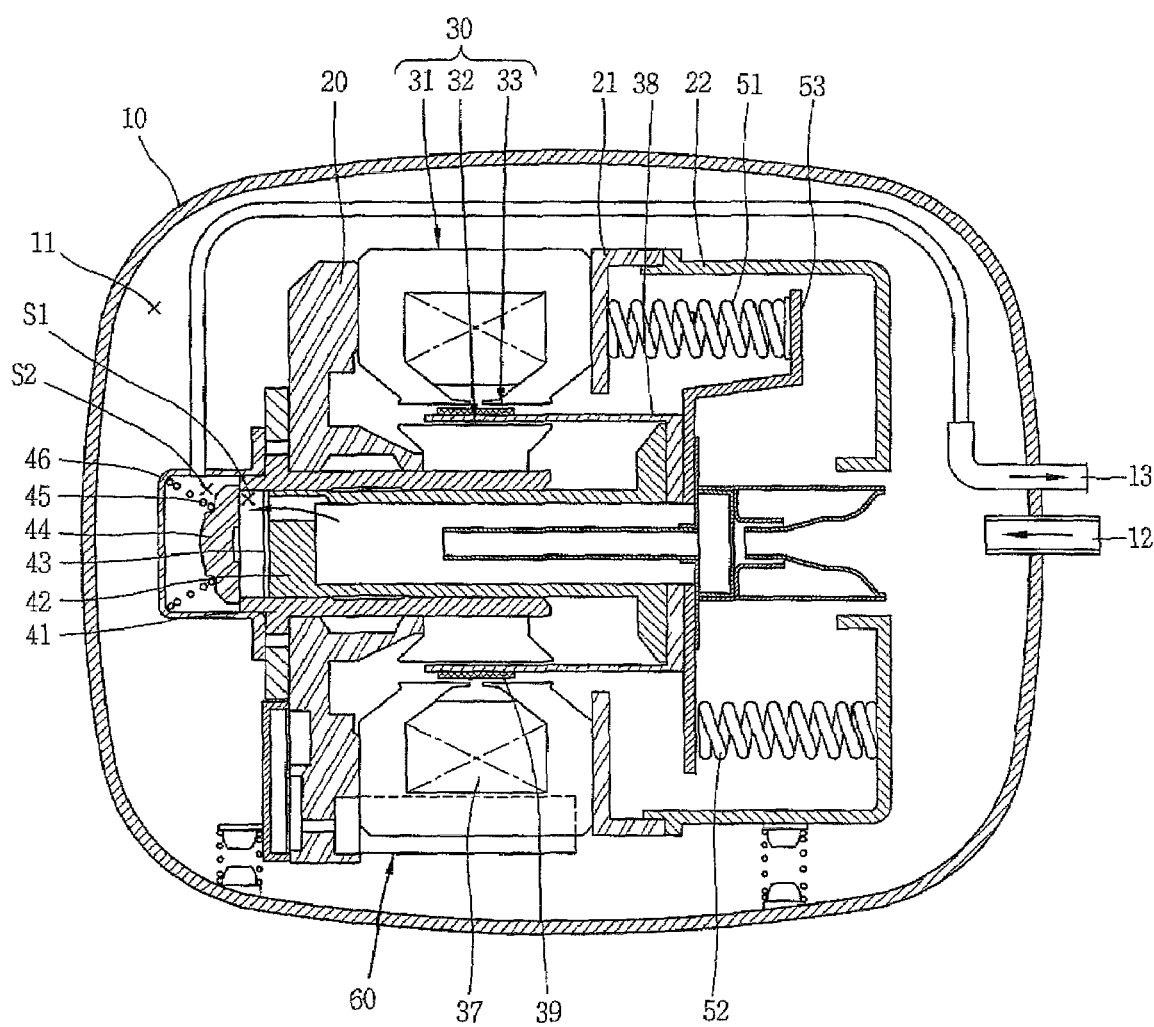
FIG. 1 is a longitudinal cross-sectional view of a vibration type reciprocating compressor according to an embodiment.

Description will now be given in detail of a reciprocating motor and a reciprocating compressor having the same according to embodiments, with reference to the accompanying drawings. Where possible, like reference numerals have been used to indicate like elements.

In general, a compressor is a component of a refrigerating cycle system, along with a condenser, an expander, and an evaporator. The compressor serves to compress fluid sucked by the evaporator and discharge the compressed fluid to the condenser. Compressors may be classified into a reciprocating type, a rotary type, and a scroll type, based on how the compressor compresses a fluid, such as a refrigerant. The reciprocating type compressor is configured such that a piston linearly moves in a cylinder so as to compress a refrigerant. The rotary compressor is configured such that a piston rotates in a cylinder so as to compress a refrigerant. The scroll compressor is configured such that two scrolls are engaged with each other to make a relative motion, thereby to compress a refrigerant.

Reciprocating compressors may be divided into a connection type and a vibration type according to a driving motor. The connection type reciprocating compressor may be configured such that a piston is connected to a crank shaft of a rotating driving motor via a connecting rod, and accordingly, a rotating motion of the crank shaft may be converted into a reciprocating motion of the piston. The vibration type reciprocating compressor may be configured such that a piston is coupled to a mover of a reciprocating driving motor so as to perform a linear motion together therewith. In the vibration type reciprocating compressor, a spring may be installed to cooperate with a motion direction of a piston, such that the piston may be bi-directionally resonated by the spring to thusly compress a refrigerant. Accordingly, the vibration type reciprocating compressor may provide higher efficiency in comparison to the other types of compressors, with lower vibration providing a reduction in noise.

Figure 2:
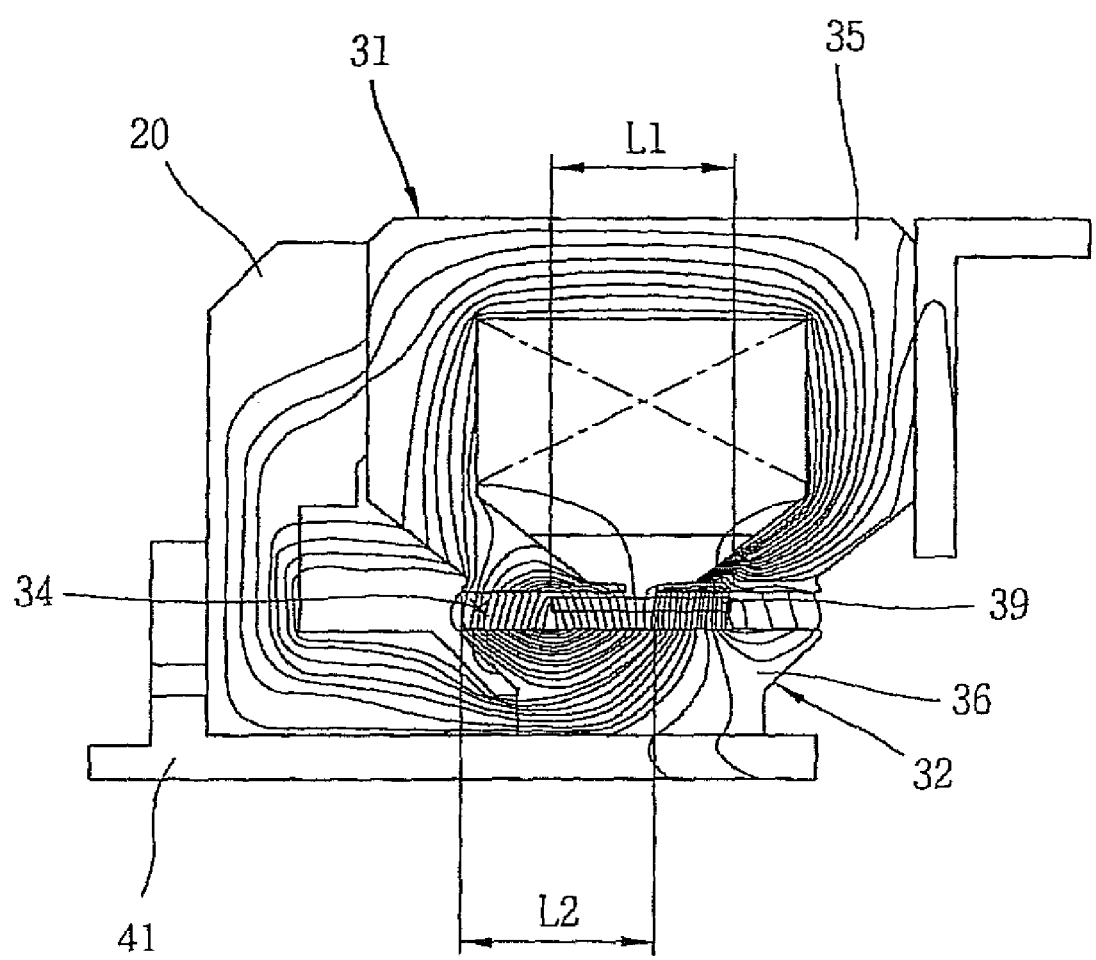
FIG. 2 is a longitudinal cross-sectional view schematically showing a distribution of magnetism in the reciprocating motor of FIG. 1.

FIG. 1 is a longitudinal cross-sectional view of a vibration type reciprocating compressor according to an embodiment. FIG. 2 is a longitudinal cross-sectional view schematically showing a distribution of magnetic force in the reciprocating motor of FIG. 1.

As shown in FIGS. 1 and 2, in the vibration type reciprocating compressor (hereinafter, simply refer to as a reciprocating compressor) of FIGS. 1-2, a frame 20 may be elastically installed in a hermetic casing 10, and a reciprocating motor 30 having a linearly reciprocating mover 33 may be installed in the frame 20, and a cylinder 41 may be inserted in the frame 20. Also, a piston 42, which may compress a refrigerant when linearly reciprocated in the cylinder 41, may be coupled to the mover 33 of the reciprocating motor 30, and a plurality of resonant springs 51 and 52 that induce a resonating motion of the piston 42 may be installed at both sides of the piston 42 in the motion direction of the piston 42.

The reciprocating motor 30 may include an outer core 31 cylindrically formed by radially laminating together a plurality of stator sheets 35, an inner core 32 cylindrically formed by radially laminating together a plurality of stator sheets 36 and disposed inside the outer core 31 with a prescribed air gap 34 therebetween, and the mover 33 movable in an axial direction in the air gap 34 between the outer core 31 and the inner core 32.

A coil 37 may be inserted into the outer core 31 and coupled thereto. The outer core 31 may be formed in a cylindrical shape, utilizing the stator sheets 35 which are closely laminated on an outer circumferential surface of the coil 37 and both side surfaces in an axial direction. The inner core 32 may be formed in a cylindrical shape, utilizing the stator sheets 36 having a prescribed length in an axial direction which are radially laminated.

A magnet holder 38 may be cylindrically formed on the mover 33, and a magnet 39 may be attached onto an outer circumferential surface of the magnet holder 38. The piston 42 may be coupled in an axial direction to a central portion of the magnet holder 38.

The air gaps 34 may be formed between the outer core 31 and the inner core 32 at both sides in the axial direction with respect to the coil 37. The air gaps 34 may be maintained by the frame 20 which supports the outer core 31 and the inner core 32.

The reciprocating compressor of FIGS. 1-2 may include a hermetic space 11, a suction pipe 12, a discharge pipe 13, a supporting plate 21, a back cover 22, a suction valve 43, a discharge valve 44, a valve spring 45, a discharge cover 46, a spring supporter 53, and an oil feeder 60, as shown in FIGS. 1-2. Reference numeral S1 denotes a compression space, and S2 denotes a discharge space.

However, in the reciprocating compressor of FIGS. 1-2, the frame 20 supports the outer core 31 and the inner core 32. The cylinder 41 coupled to the inner core 32 may be fabricated by using an expensive non-magnetic substance, which causes an increase in the fabricating costs of the reciprocating motor 30 and a reciprocating compressor having the same. If the frame 20 is fabricated using a magnetic substance, a magnetic flux created in the gaps 34 between the outer core 31 and the inner core 32 may partially leak out through the frame 20 or the cylinder 41, which may drastically decrease the performance of the reciprocating motor 30. To avoid such a problem, the frame 20 or the cylinder 41 may be fabricated using a non-magnetic substance to prevent the leakage of the flux. However, the non-magnetic substance requires high cost as compared to the magnetic substance, resulting in an increase in the fabricating costs of the motor and the compressor having the same.

Further, in spite of the high cost of the magnet 39, it is possible to reduce the length of the magnet 39 of the reciprocating motor 30, resulting in increased fabricating costs of the reciprocating motor and a reciprocating compressor having the same. That is, in order to increase an efficiency of the reciprocating motor 30, the magnet 39 should be located in at least one gap upon its reciprocating motion. As a result, as shown in FIG. 2, a length L1 of the magnet 39 should be as long as at least a length L2 equal to the sum of the length of the coil 37 in an axial direction and the length of the one gap in the axial direction.

To solve such problems, the outer core 31 may be formed in a polygonal shape with a narrow inner circumferential surface, to thereby reduce the length of the magnet 39. However, this structure causes the coil 37 to lean from a narrowed incline toward its inner circumferential surface when the coil 37 is wound, which make the process of winding the coil 37 complicated. In addition, since the outer circumferential surface of the outer core 31 should be extended as great as the area narrowed at the inner circumferential surface thereof, the entire area or height of the motor is increased accordingly.

Figure 3:
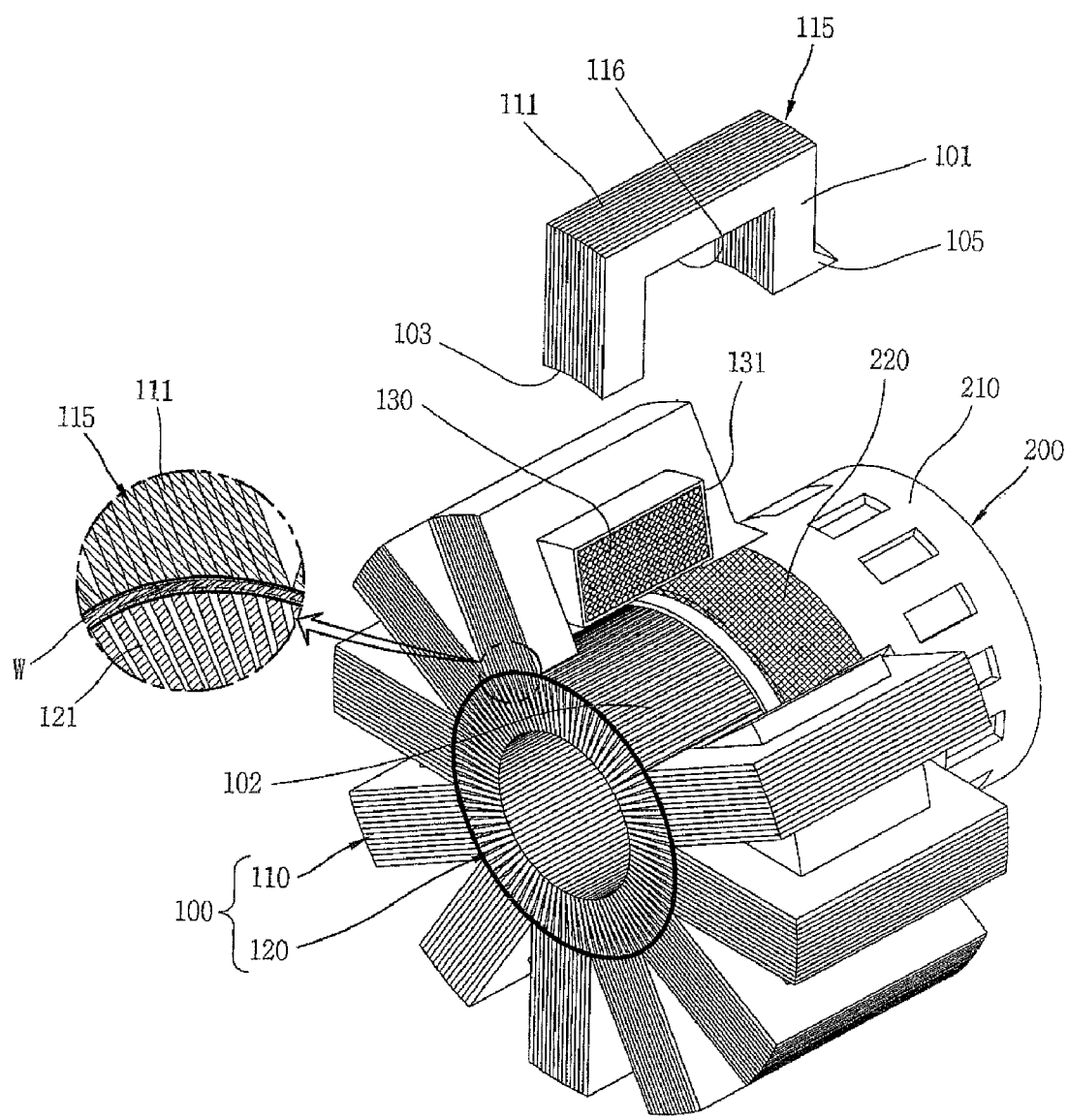
FIG. 3 is a disassembled view of a reciprocating motor in accordance with an embodiment.
Figure 4:
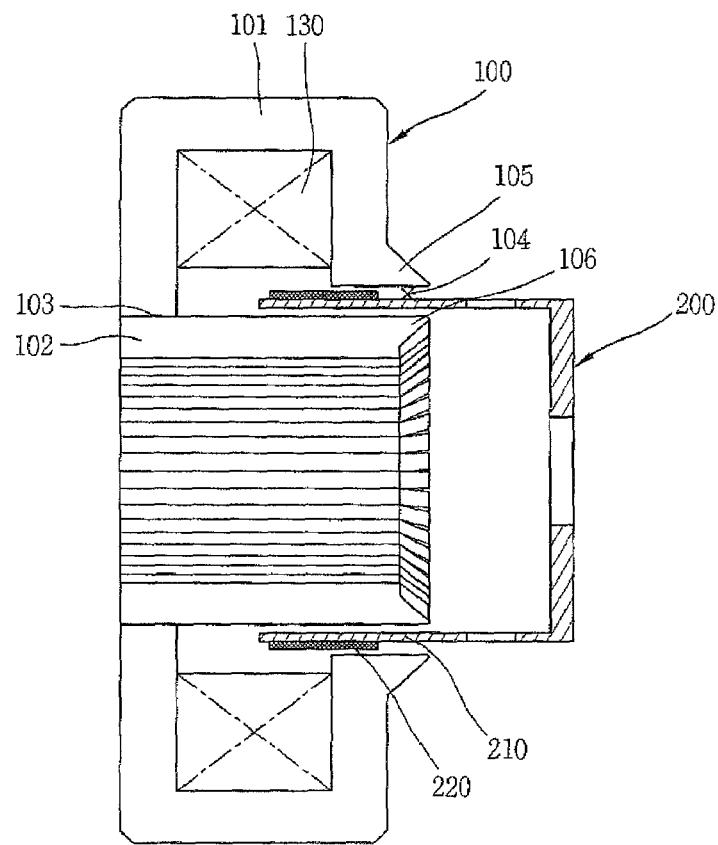
FIG. 4 is a longitudinal cross-sectional view of the reciprocating motor of FIG. 3.

As shown in FIGS. 3 and 4, a reciprocating motor according to an embodiment may include a stator 100 cylindrically stacked, having a coil 130 and an air gap at only one side of the coil 130, and a mover 200 inserted in the air gap of the stator 100 and having a magnet 220 that linearly moves in an axial direction of the motor.

The stator 100 may include a first magnetism path 101 having the coil 130 mounted therein, a second magnetism path 102 disposed at an inner side of the first magnetism path 101, a magnetism path connecting portion 103 that connects one side of the first magnetism path 101 to one side of the second magnetism path 102, an air gap portion 104 formed at another side of the first magnetism path 101 comprising a radially spaced interval between the first magnetism path 101 and the second magnetism path 102, and a first pole portion 105 and a second pole portion 106, respectively, formed at an end portion of the first magnetism path 101 and a corresponding end portion of the second magnetism path 102 facing the first magnetism path 101.

A coil mounting groove 116 may be formed at an inner circumferential surface of the first magnetism path 101, having a particular area and depth in an axial direction, to receive the coil 130 mounted therein. The coil mounting groove 116 may be configured in an approximately rectangular shape such that both side surfaces in its axial direction are not narrowed toward the opening of the first magnetism path 101. Each of the first and second pole portions 105 and 106 may have an inclined outer circumferential surface so as to have a cross section enlarged toward their ends, thus formed in an approximately triangular or wedge shape. The magnetism connecting portion 103 may be formed within a range in a radial direction of the air gap portion 104, which facilitates the connection between the first magnetism path 101 and the second magnetism path 102 and also widens a magnetism region.

The stator 100 may include an outer core 110 having the coil 130 and formed in a cylindrical shape, and an inner core 120 having one side connected to an inner side of the outer core 110 and another side spaced apart from the outer core 110. The outer core 110 may include a plurality of stator blocks 115 configured by laminating together a plurality of stator sheets 111. Such stator blocks 115 may be radially stacked such that the outer core 110 has an overall cylindrical shape. The outer core 110 may also be configured such that the stator blocks 115 come in contact with each other at both side surfaces at their inner circumferential surface and are spaced apart from each other at both side surfaces at their outer circumferential surface. Although not shown, the outer core 110 may be configured such that the plurality of stator sheets 111 are radially stacked sheet by sheet.

The coil mounting groove 116 may be formed at the inner circumferential surface of the stator blocks 115 of the outer core 110, thereby to form the first magnetism path 101 in the shape of 'ᄃ'. One side end of the first magnetism path 101 may be integrally formed with the magnetism path connecting portion 103, based upon the coil mounting groove 116, so as to be connected to the second magnetism path 102. Another end of the first magnetism path 101 may be integrally formed with the first pole portion 105 extending outwardly so as to configure the air gap portion 104 together with the end of the second magnetism path 102 corresponding to the another end of the first magnetism path 101.

A plurality of stator sheets 121 may be radially stacked sheet by sheet so as to configure the inner core 120 in a cylindrical shape. Both side surfaces of the sheets 121 at the inner circumference of the inner core 120 may contact each other, with both side surfaces thereof at the outer circumference of the inner core 120 spaced apart from each other by a certain interval in a circumferential direction.

A central longitudinal axis of the inner core 120 may extend horizontally. One side end in its axial direction may be connected to the outer core 110 via the magnetism path connecting portion 103, and another side end in its axial direction spaced apart from the outer core 110 with the air gap portion 104 interposed therebetween. An end in the axial direction of the inner core 120, configuring the air gap portion 104, may be integrally formed with the second pole portion 106, which may extend outwardly so as to correspond to the first pole portion 105.

The outer core 110 and the inner core 120 may be assembled to each other within a range of one half the distance in a radial direction from the inner circumferential surface of the stator 100 to the outer circumferential surface thereof, more particularly, within a range of the air gap portion 104. That is, the outer core 110 and the inner core 120 may be respectively configured by laminating together a plurality of stator sheets 111 and 121. Accordingly, if a connection point between the outer and inner cores 110 and 120 is more than one half the distance in a radial direction from the inner circumferential surface of the stator 100 to the outer circumferential surface thereof, an interval between the stator sheets 121 configuring the inner core 120 increases, which may result in difficulty in connecting the stator sheets 121 configuring the inner core 120 and the stator sheets 111 configuring the outer core 111, and also reduction of the magnetism region proportional to as the additional interval. Hence, in this embodiment, the connection point W between the outer and inner cores 110 and 120 is within a range of one half the distance in a radial direction from the inner circumferential surface of the stator 100 to the outer circumferential surface thereof, more particularly, within the range of the air gap portion 104.

Figure 5:
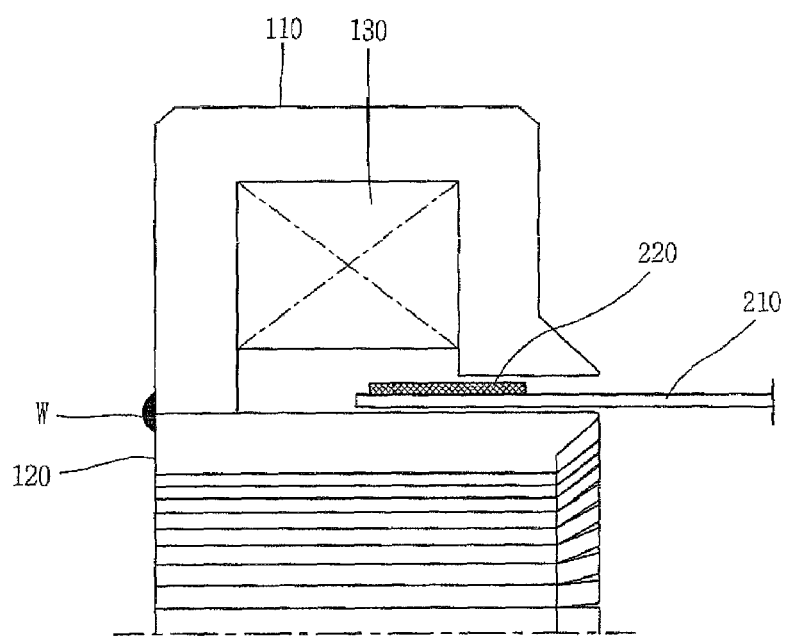
FIGS. 5 and 6 are schematic views respectively illustrating a method for connecting outer core and inner core to each other in the reciprocating motor of FIG. 3.
Figure 6:
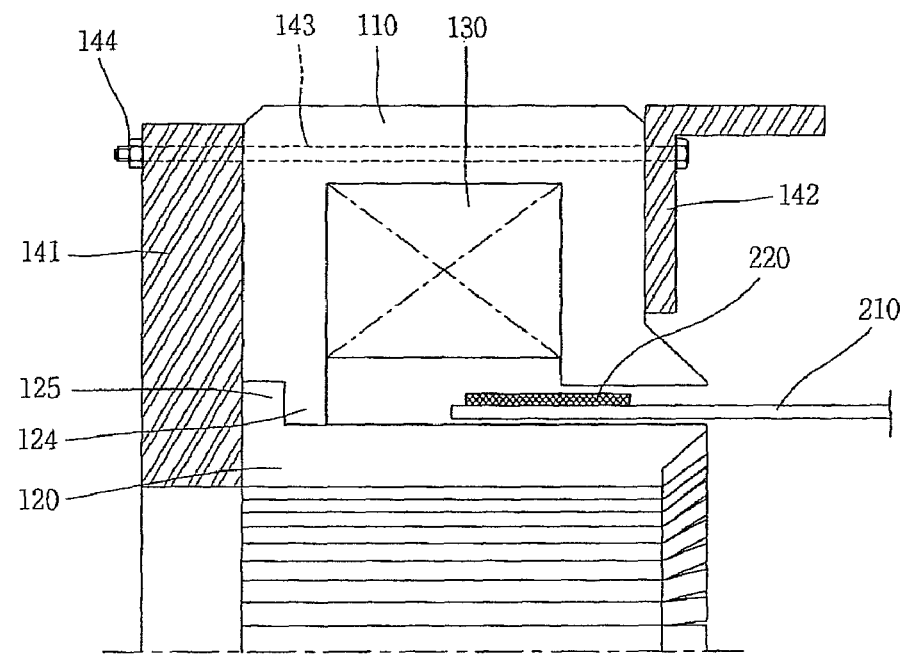

Sides of the outer and inner cores 110 and 120 may be coupled, for example, by welding, as shown in FIG. 5, or may be stepped to couple them, as shown in FIG. 6. For example, to couple the outer and inner cores 110 and 120 to each other by welding, as shown in FIG. 5, the outer circumferential surface of the inner core 120 may be aligned with the inner circumferential surface of the outer core 110. Then, the outer and inner cores 110 and 120 may be welded (W) together at an outer surface of the contacting portions along a circumferential direction, thus to connect the outer and inner cores 110 and 120 to each other.

On the other hand, to couple the outer and inner cores 110 and 120 using stepped portions as shown in FIG. 6, stepped portions 124 and 125 may be formed in an axial direction of the outer core 110 and inner core 120, so that the stepped portions 124 and 125 engage with each other. Supporting members 141 and 142, such as a circular disc frame or annular frame, may be disposed at both side surfaces of the outer and inner cores 110 and 120 in an axial direction, and then both the supporting members 141 and 142 may be tightened by using, for example, a bolt 143 that penetrates both of the supporting members 141 and 142 and nuts 144 coupled to the bolt 143, such that the stepped portions 124 and 125 of the outer and inner cores 110 and 120 are coupled in the axial direction to each other. The supporting members 141 and 142 may be formed of a non-magnetic substance. However, the outer core 110 and the inner core 120, namely, the first and second magnetism paths 101 and 102 may be connected to each other via the magnetism path connecting portion 103, which allows most of magnetic flux to move from the first magnetism path 101 to the second magnetism path 102 via the magnetic path connecting portion 103. Hence, even if any one of the supporting members 141 and 142 is formed of a magnetic substance, a flux leakage may rarely occur, resulting in a reduction in the fabricating cost.

The coil 130 may be wound on a bobbin 131 configured to be inserted in the coil mounting groove 116 of the outer core 110. The bobbin 131 may be formed in an annular shape using an insulating material, such as plastic, and may have cross section having a '☐' shape.

The mover 200 may include a magnet holder 210 formed in a cylindrical shape, and a magnet 220 attached onto an outer circumferential surface of the magnet holder 210 to form a magnetic flux together with the coil 130. The magnet holder 210 may be formed of a non-magnetic substance in order to prevent flux leakage; however, it is not limited thereto.

The magnet 220 may be formed in one cylindrical shape to be then inserted in the magnet holder 210. In an alternative manner, the magnets 220 may be formed in a plurality of circular arcs so as to be attached onto the outer circumferential surface of the magnet holder 210 one by one. In the case of attaching the magnets 220 one by one, supporting members (not shown), such as fixing rings, may separately be provided at the outer circumferential surface of the magnets 220.

Figure 7:
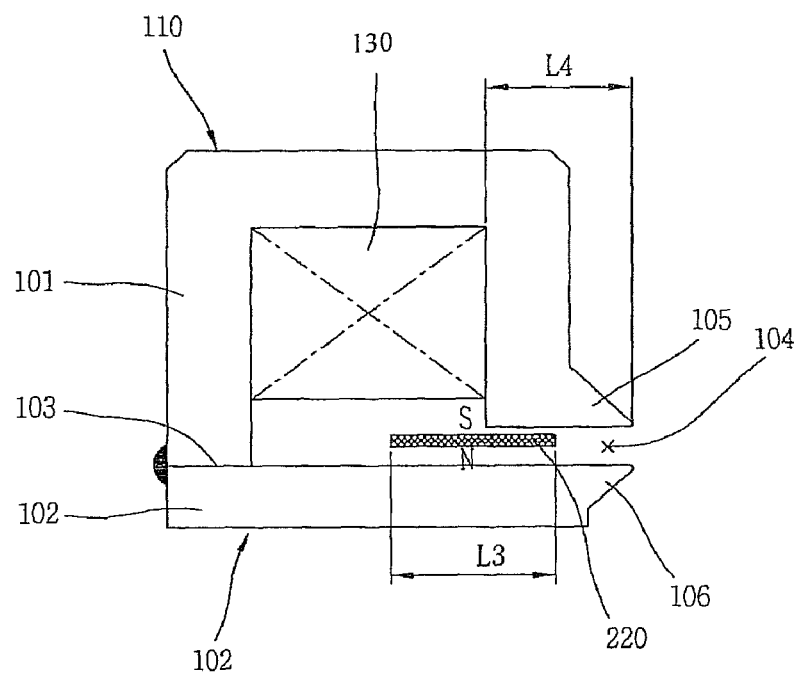
FIG. 7 is a schematic view showing a relation between a gap and a magnet in the reciprocating motor of FIG. 3.

The magnet 220, as shown in FIG. 7, may be configured such that its length L3 in an axial direction is not shorter than a length L4 of the air gap portion 104 in the axial direction, more particularly, longer than the length L4 of the air gap portion 104 in the axial direction. At its initial position or during its operation, the magnet 220 may be disposed such that at least one end thereof in the axial direction is located inside the air gap portion 104, in order to ensure a stable reciprocating motion.

Figure 8:
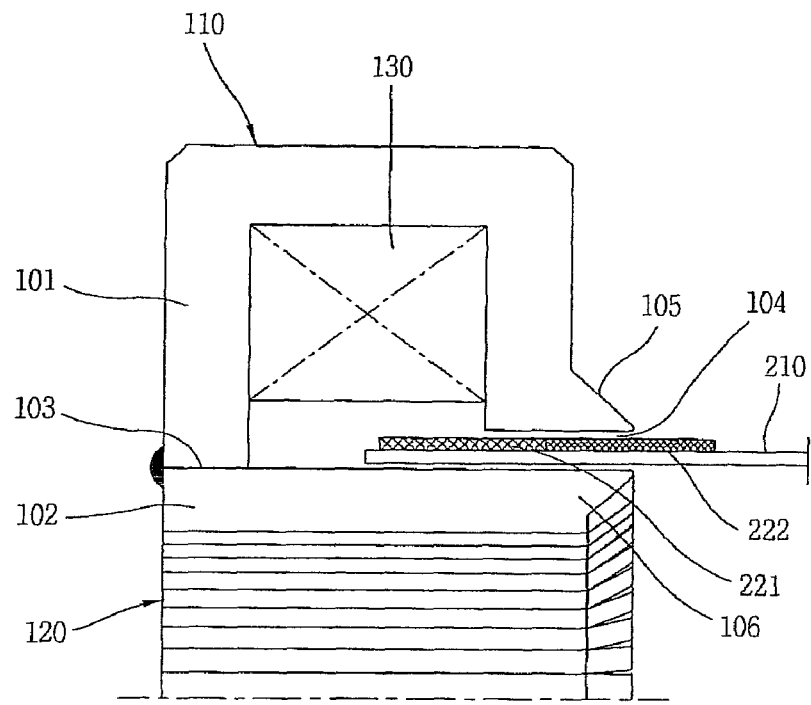
FIG. 8 is a schematic view showing another embodiment of a magnet in the reciprocating motor of FIG. 3.

One magnet 220 may be disposed in the axial direction as shown in FIGS. 3 to 7. However, in some cases, a plurality of magnets 220 may be disposed in the axial direction, as shown in FIG. 8. In this case, a plurality of magnets 221 and 222 may be disposed such that opposite polarities alternate, thus increasing magnetic force. That is, in the case of disposing one magnet 220 in the axial direction, its outer circumferential surface may be an S-pole and its inner circumferential surface may be an N-pole. In the case of disposing a plurality magnets, a first column may be configured such that the outer circumferential surface of the magnet 221 may be the S-pole and its inner circumferential surface may be the N-pole, while a second column is configured such that the outer circumferential surface of the magnet 222 may be the N-pole and its inner circumferential surface may be the S-pole.

Hereinafter, operation of a reciprocating motor having such configuration according to embodiments disclosed herein will be described.

That is, upon applying power to the coil 130, a magnetic flux may be generated around the coil 130. The magnetic flux may then create a closed loop along the outer and inner cores 110 and 120 of the stator 100. In cooperation with an interaction between the magnetic flux created between the outer and inner cores 110 and 120 and a magnetic flux generated by the magnet 220, the magnet 220 may linearly move together with the magnet holder 210 in the axial direction. When a flow direction of current applied to the coil 130 alternately changes, the direction of the magnetic flux of the coil 130 may also change, to make the magnet 220 linearly reciprocate.

Figure 9:
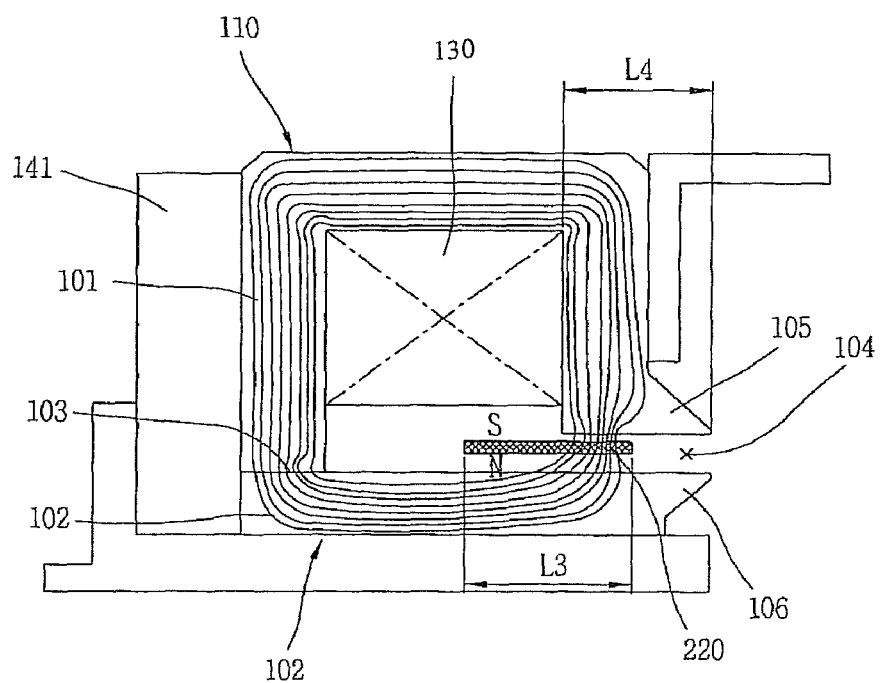
FIG. 9 is a longitudinal cross-sectional view schematically showing a distribution of magnetism in the reciprocating motor of FIG. 3.

As shown in FIG. 9, since the outer core 110 and the inner core 120 are connected to each other at their one sides, most of the magnetic flux generated between the outer and inner cores 110 and 120 is not leaked outside but forms a closed loop between the cores 110 and 120. Hence, even if both side surfaces of the stator 100 are supported by a magnetic substance, the magnetic flux is not leaked to the magnetic substances, thereby maintaining efficiency of the reciprocating motor without increasing its fabricating cost.

FIG. 10 shows a table showing testing results. Such a test was given to compare iron losses between a case of a stator with air gaps formed at both sides of a coil, as shown in the embodiment of FIGS. 1-2, and a case of the stator 100 with an air gap formed at only one side of the coil 130 according to the embodiment of FIGS. 3-9. As shown in the table, when the supporting members for supporting the stator are formed of aluminum (Al) which is a non-magnetic substance, the two cases show the same iron loss of 15Ω. However, when the supporting members are all formed of steel which is a magnetic substance, the iron loss is increased to 47Ω in the case of the embodiment of FIGS. 1-2, while it is not increased in the case of the embodiment of FIGS. 3-9. That is, when the one sides of each core are connected to each other, the magnetic flux does not leak out, but flows in the stator 100 which has strong magnetism, which results in a drastic reduction in loss for the motor.

On the other hand, if a such reciprocating motor is employed in a vibration type reciprocating compressor, such configuration would be described as follows. The configuration of the reciprocating motor has been aforementioned, and its detailed description thereof will thusly not be repeated. However, hereinafter, characteristics obtained by applying the reciprocating motor to a vibration type reciprocating compressor will be described.

Figure 11:
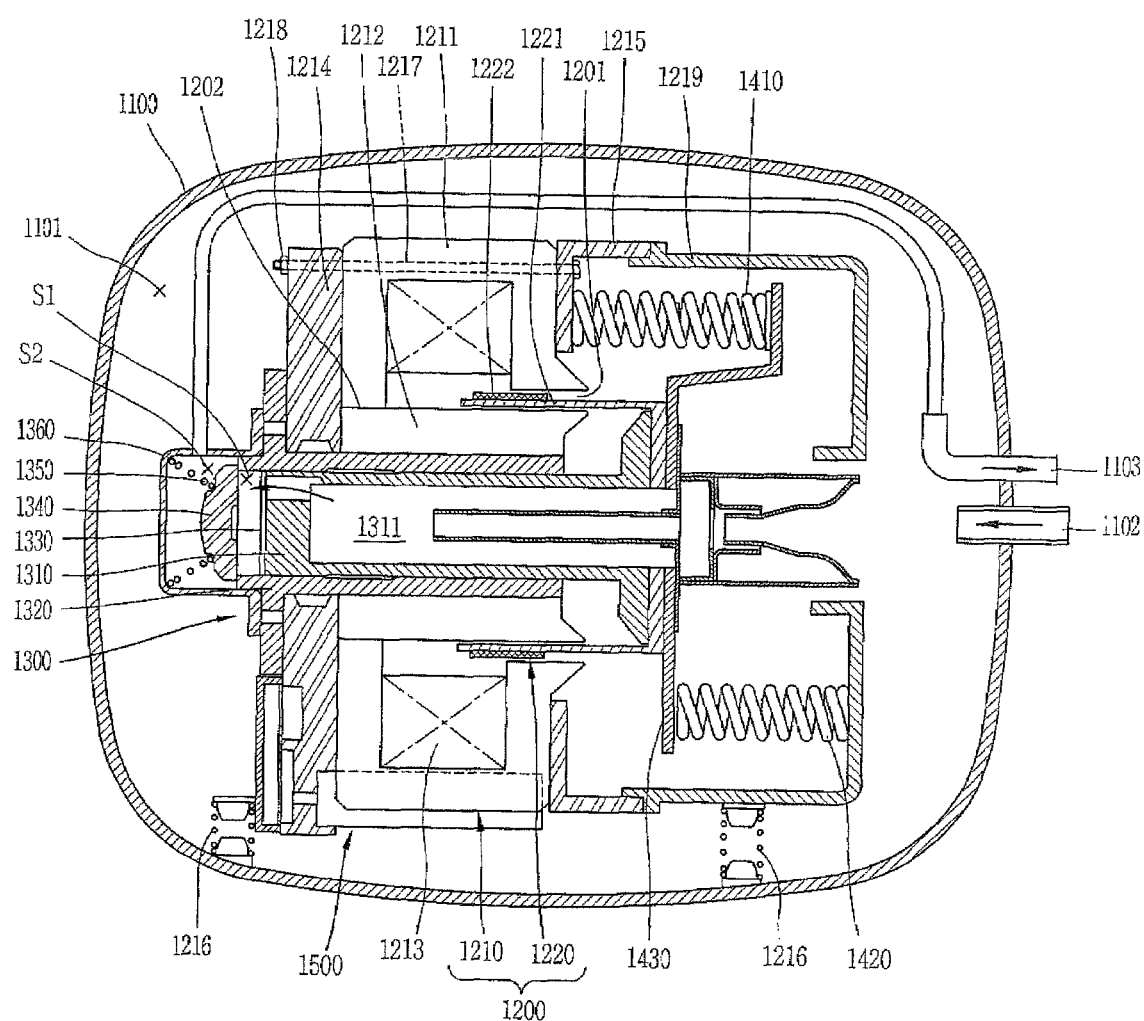
FIG. 11 is a longitudinal cross-sectional view showing a reciprocating compressor having the reciprocating motor of FIG. 3 in accordance with an embodiment.

As shown in FIG. 11, a reciprocating compressor according to an embodiment may include a hermetic container 1100, a reciprocating motor 1200 disposed in the hermetic container 1100 that generates a reciprocating force, a compression part 1300 that compresses a refrigerant by receiving the reciprocating force from the reciprocating motor 1200, and an oil feeder 1500 that pumps and supplies oil to each portion to be lubricated in the reciprocating motor 1200 and in the compression part 1300.

The hermetic container 1100 has a hermetic space 1101 therein. A suction pipe 1102 that guides a refrigerant to be sucked into the hermetic space 1101 from the refrigerating cycle may be connected to one side of the hermetic space 1101. A discharge pipe 1103 that guides a refrigerant compressed in the compression part 1300 to be discharged to the refrigerating cycle may be connected to another side of the hermetic space 1101. A certain amount of oil, which is pumped by the oil feeder 1500 and supplied to the compression part 1300 so as to lubricate the compression part 1300, may be stored in a lower portion of the hermetic container 1100.

The reciprocating motor 1200 may include a stator 1210 having a coil 1213, an outer core 1211, and an inner core 1212. The outer and inner cores 1211 and 1212 may be spaced apart from each other at one side of the stator 1210 to form an air gap portion 1201 and may be connected to each other at another side of the stator 1210 to form a magnetism path connecting portion 1202. A mover 1220 may be positioned to linearly reciprocate in the air gap portion 1201 of the stator 1210 in cooperation with the coil 1213.

In the stator 1210, both side surfaces of the outer and inner cores 1210 and 1211 in the axial direction may be supported by first frame 1214 and second frame 1215, respectively. The first and second frames 1214 and 1215 may be elastically supported by a plurality of support springs 1216 at a lower surface of the hermetic container 1100, namely, at a lower surface of the hermetic space 1101.

The first and second frames 1214 and 1215 may be tightened to each other by using a bolt 1217 that penetrates the outer core 1211 and nuts 1218 coupled to the bolt 1217. A back cover 1219 that supports resonant springs 1410 and 1420 to be explained later may be, for example, welded to one side surface of the second frame 1215. Further, the second frame 1215 and the back cover 1219 may be connected to each other in another manner, such as press-fitting or coupling.

The first and second frames 1214 and 1215 or the back cover 1219 may be formed of a non-magnetic substance. However, as mentioned above, in considering the remarkable reduction in leakage of magnetic flux out of the reciprocating motor 1200, a low-cost magnetic substance may be used, rather than a high-cost, non-magnetic substance so as to reduce a fabricating cost of the compressor.

The inner core 1212 may be fixedly inserted on an outer circumferential surface of a cylinder 1320 to be explained later. However, in some embodiments, such as that shown in FIG. 12, an annular protrusion 1214a may protrude from one side surface of the first frame 1214. The cylinder 1320 may be fixedly inserted in the annular protrusion 1214a, while the inner core 1212 may be fixedly inserted on an outer circumferential surface of the annular protrusion 1214a. In this case, a first resonant spring 1410 to be explained later may be supported at a rear surface of the annular protrusion 1214a, similar to that shown in FIG. 13.

The mover 1220 may include a magnet holder 1221 formed in a cylindrical shape, and a magnet 1222 coupled to an outer circumferential surface of the magnet holder 1221. The detailed description thereof is the same as that in the reciprocating motor described above, and thus, will not be repeated.

The compression part 1300 may include a piston 1310 connected to the magnet holder 1221 to linearly reciprocate, a cylinder 1320 having the piston 1310 slidably inserted therein and forming a compression space S1, a suction valve 1330 mounted at a front side of the piston 1310 that opens/closes a suction passage 1311 formed in the piston 1310 so as to control a suction of a refrigerant, a discharge valve 1340 detachably mounted at a front side of the cylinder 1320 that controls a discharge of a refrigerant, a valve spring 1350 that supports the discharge valve 1340, and a discharge cover 1360 forming a discharge space S2 in which the discharge valve 1340 and the valve spring 1350 may be accommodated. The compression part 1300 may further include first and second resonant springs 1410 and 1420 installed at both front and rear sides of the piston 1310 to resonate the reciprocating motion of the piston 1310.

The cylinder 1320 as well as the piston 1310, may be formed of a magnetic substance in spite of being in direct contact with the inner core 1212. That is, since the outer and inner cores 1211 and 1212 of the stator 1210 may be connected to each other, a leakage of magnetic flux may be drastically reduced. Accordingly, similar to the aforesaid first frame 1214, although the low-cost magnetic substance may be used for the cylinder 1320, which contacts with the inner core 1212, the efficiency of the motor may be maintained. In addition, the cylinder 1320 may be made of cast iron having a low price and superior abrasion resistance, and accordingly, an abrasion that occurs due to friction between the cylinder 1320 and the piston 1310 may be decreased.

The suction valve 1330 and the discharge valve 1340 may also be formed of a magnetic substance. Here, the suction valve 1330 may be formed as a thin plate, and a metal may be used therefore However, for the discharge valve 1340, if capable of attenuating noise generated upon switching a valve, in spite of using a low-cost magnetic metal, a performance of the compressor may be prevented from being degraded due to the leakage of flux. The valve spring 1350 that supports the discharge valve 1340 or the discharge cover 1360 that supports and accommodates the valve spring 1350 may be fabricated using a magnetic substance, thus remarkably reducing the fabricating cost of the compressor.

Figure 12:
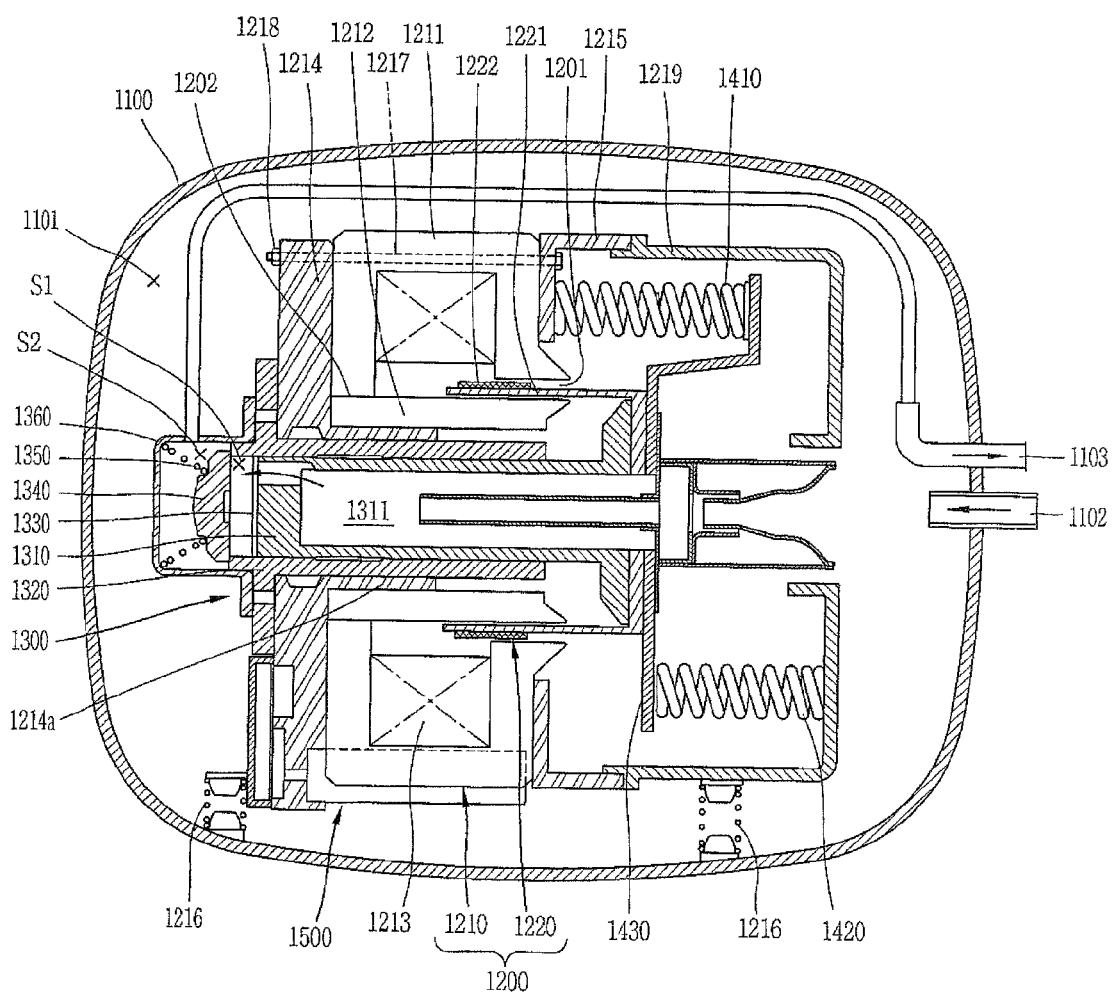
FIG. 12 is a longitudinal cross-sectional view showing a reciprocating compressor having the reciprocating motor of FIG. 3 in accordance with another embodiment.

The first and second resonant springs 1410 and 1420 may, respectively, be configured as compression coil springs. As shown in FIGS. 11 and 12, the first and second resonant springs 1410 and 1420 may be, respectively, provided in plurality, so as to be disposed at both front and rear side surfaces of the piston 1310. Further, a spring supporter 1430 may be coupled to the spring 1310, and corresponding ends of the first and second resonant springs 1410 and 1420 may be fixed to both front and rear side surfaces of the spring supporter 1430, respectively. In this case, the front end of the first resonant spring 1410 and the rear end of the second resonant spring 1420 may be fixed to inner surfaces of the second frame 1215 and the back cover 1219, respectively.

Figure 13:
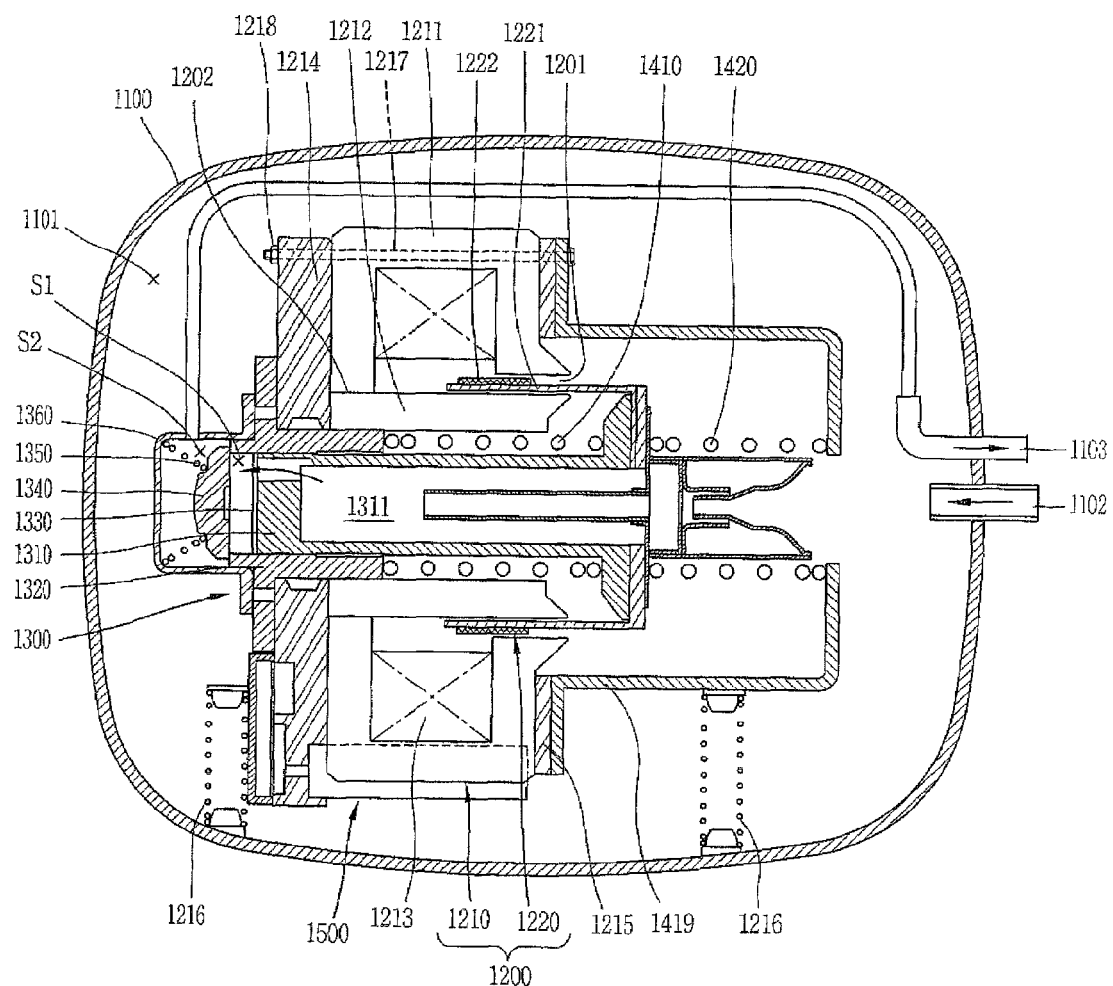
FIG. 13 is a longitudinal cross-sectional view showing another embodiment of a resonant spring in the reciprocating compressor of FIGS. 11 and 12.

As shown in FIG. 13, the first and second resonant springs 1410 and 1420 may be provided one each, to be supported at the piston 1310, respectively. For example, one end of the first resonant spring 1410 may be supported at a front surface of a flange portion (not shown) of the piston 1310 and another end thereof may be supported at a rear surface of the cylinder 1320. One end of the second resonant spring 1420 may be supported at a rear surface of the flange portion of the piston 1310 and another end thereof may be supported at the inner surface of the back cover 1219.

An operation of the reciprocating compressor having such configuration will now be described.

That is, similar to the reciprocating motor, when the magnet holder 1221 reciprocates together with the magnet 1222, the motion of the magnet 1222 may be transferred to the piston 1310 of the compression part 1300 by the magnet holder 1221. The piston 1310 then may linearly reciprocate inside the cylinder 1320 to compress a refrigerant.

For example, when the piston 1310 is moved backwardly, a refrigerant in the hermetic container 1100 may be sucked into the compression space S1 via the suction passage 1311 formed in the piston 1310. When the piston 1310 is moved forwardly, the suction passage 1311 may be closed by the suction valve 1330 such that the refrigerant inside the compression space S1 is compressed. The compressed refrigerant may then be discharged out of a refrigerating cycle via the discharge pipe 1103. During such compression operation, oil contained in the hermetic container 1100 may be pumped by the operation of the oil feeder 1500 to be supplied to a frictional portion between the piston 1310 and the cylinder 1320, thereby performing a lubricating operation.

Now, another embodiment of a reciprocating compressor according to an embodiment will be described.

That is, it has been described that the inner core of the reciprocating motor may be fixedly inserted on the outer circumferential surface of the cylinder or fixedly inserted on the annular protrusion of the first frame having the cylinder inserted therein so as to dispose the cylinder inside the reciprocating motor in the axial direction. However, this embodiment may be implemented such that the cylinder may be disposed outside the reciprocating motor in its axial direction.

Figure 14:
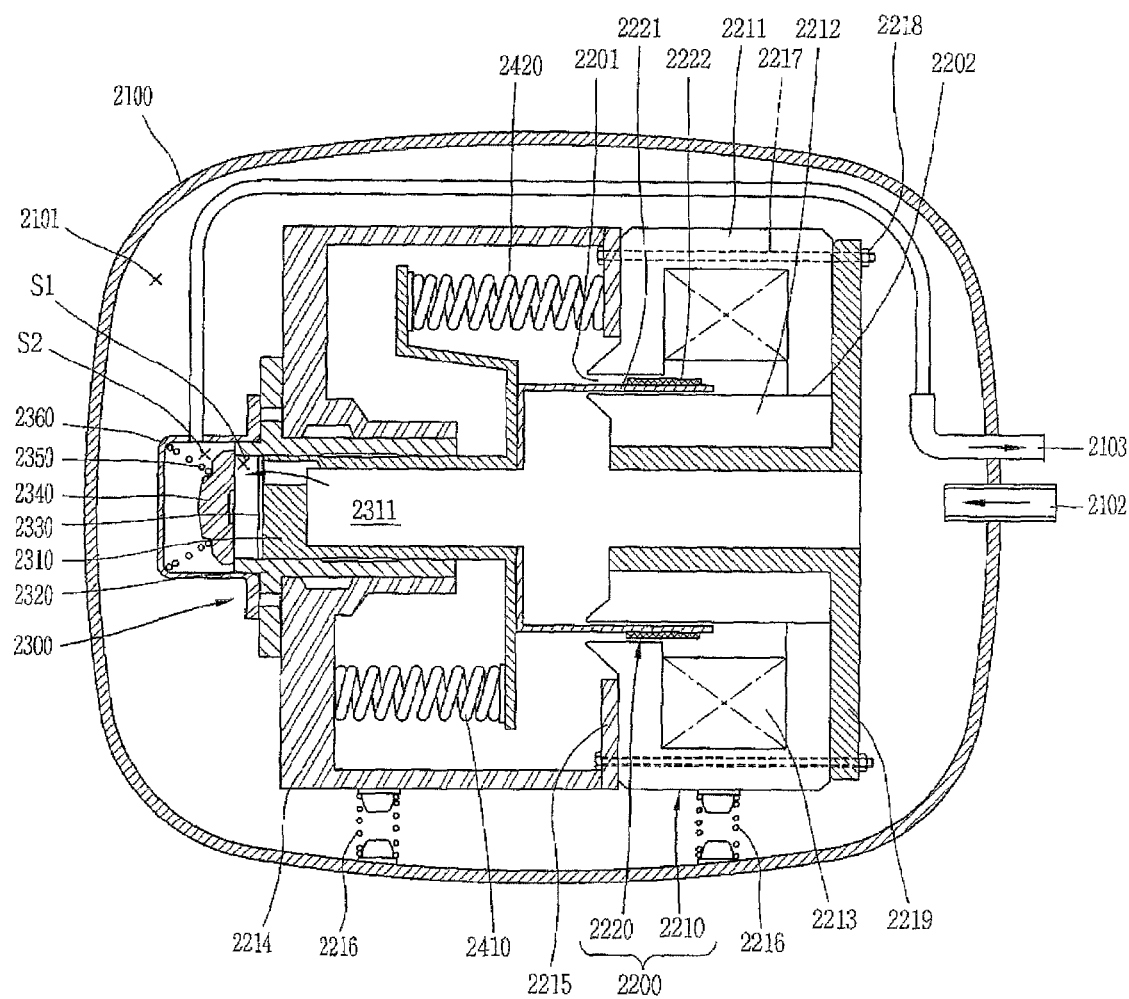
FIG. 14 is a longitudinal cross-sectional view showing another embodiment of a reciprocating compressor having the reciprocating motor of FIG. 3.

For example, as shown in FIG. 14, a cylinder 2320 may be inserted in the first frame 2214 to be coupled thereto, and a magnet holder 2221 may be coupled to a piston 2310, which may be slidably inserted in the cylinder 2320. However, the magnet holder 2221 may be coupled to a rear side of the piston 2310 and accordingly a magnet 2222 may be coupled to an outer circumferential surface of the magnet holder 2221. Outer core 2211 and inner core 2212, which each may be formed in a cylindrical shape, may be, respectively, disposed outside and inside the magnet 2222. One end of each of the outer and inner cores 2211 and 2212 may be connected to each other as described in relation to the reciprocating motor 1200. A piston supporter 2430 may be coupled to the piston 2310, and a plurality of first resonant springs 2410 and a plurality of second resonant spring 2420 may be disposed at front and rear sides of the spring supporter 2430, respectively. Here, the first and second resonant springs 2410 and 2420 may be disposed one each, as shown in FIG. 13. In this case, the first and second resonant springs 2410 and 2420 may be fixed to the piston 2310 without the spring supporter 2430 being installed.

A reciprocating motor 2200 and a compression part 2300 are similar to those in the aforementioned embodiments, and thus, their detailed description will be omitted. However, the outer and inner cores 2211 and 2212 may be spaced apart from each other at one side, with respect to a coil 2213, to form an air gap portion 2201 therebetween, and also may be connected to each other at another side, so as to form a magnetism path connecting portion 2202. The side of the stator 2210 having the air gap portion 2201 may be supported by a second frame 2215, and the side of the stator 2210 having the magnetism path connecting portion 2202 may be supported by a back cover 2219. The second frame 2215 and the back cover 2219 may be formed of a magnetic substance. A first frame 2214 contacted with the second frame 2215 and the cylinder 2320 inserted in the first frame 2214 may also be formed of a magnetic substance.

As such, embodiments are implemented such that one side of each of outer and rear cores configuring a stator are connected to each other based upon a coil, to prevent a magnetic flux generated by the coil and the magnet from being leaked out of the stator. Accordingly, even if a frame supporting the outer and inner cores or a cylinder coupled to the frame or the inner core is fabricated using a magnetic substance, the magnetic flux may not be leaked to the frame or the cylinder, thus to prevent a degradation of motor efficiency. Hence, it is possible to fabricate components of the reciprocating compressor employing such reciprocating motor by using a relatively low-cost magnetic substance, resulting in a decrease of a fabricating cost of the compressor.

In addition, embodiments disclosed herein allow a length of a magnet to be decreased, which results in a reduction of cost required for the magnet, thereby decreasing fabricating costs of the reciprocating motor and a reciprocating compressor employing the reciprocating motor. That is, the length of the magnet may be formed to be equal to or longer than at least a length of the air gap portion in its axial direction. However, if the air gaps are formed at both sides based upon the coil, in order for the magnet to be affected by the magnet flux flowing through the air gaps, the length of the magnet should be the same as a length of one air gap, namely, a length equal to the sum of the length of the one air gap in its axial direction and a length of the coil in its axial direction, during the reciprocating motion of the magnet. On the other hand, as shown in the embodiments disclosed herein, if the air gap is formed at only one side of the coil, during the reciprocating motion of the magnet, the length of the magnet only needs to be longer than the length of the air gap, and thus, the required length of the magnet is shorter.

The reciprocating motor and the reciprocating compressor having the same according to embodiments disclosed herein may be widely applied to home alliances, such as refrigerators or air conditioners. Also, they may be applied to industrial equipment using a refrigerating cycle, as well as to the home alliances.

Figure 15:
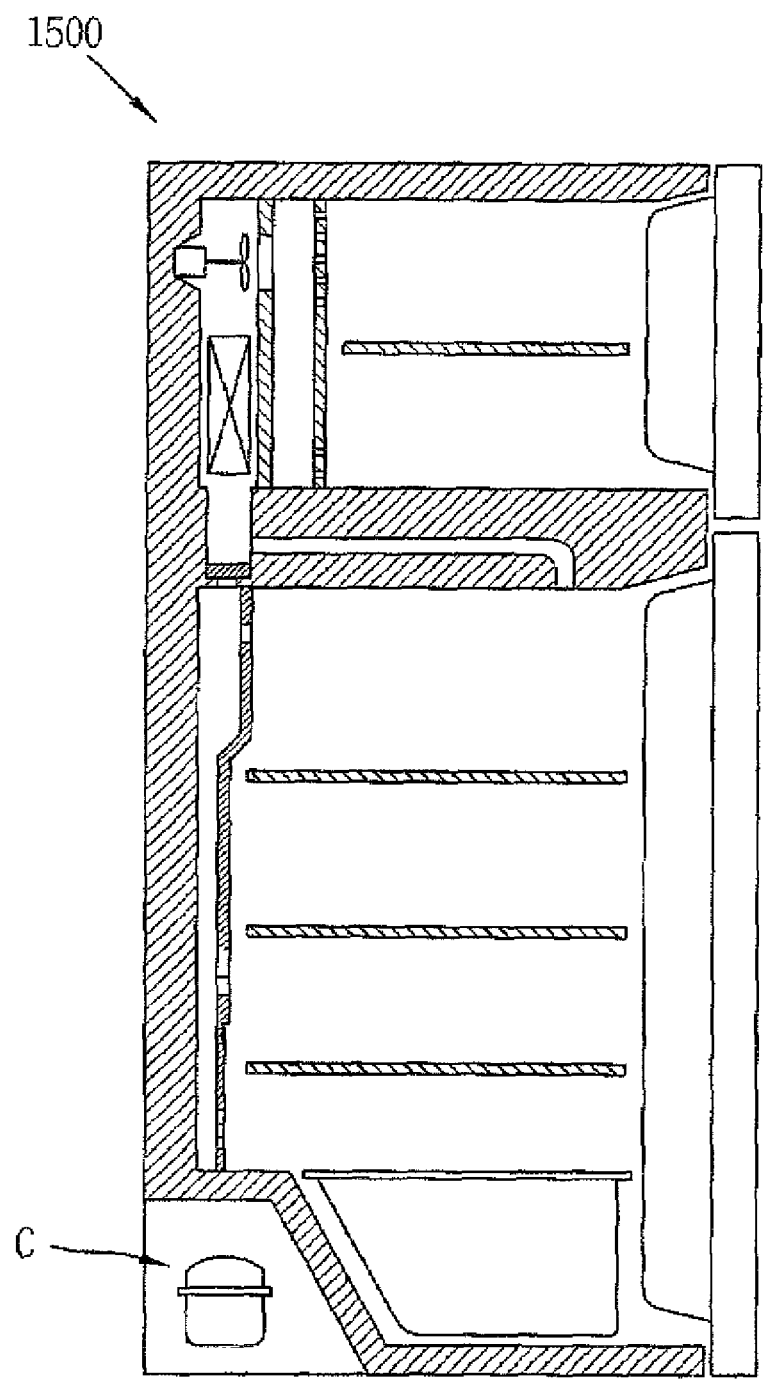
FIG. 15 is a schematic drawing of an exemplary refrigerator including a reciprocating compressor according to embodiments disclosed herein.
Figure 16:
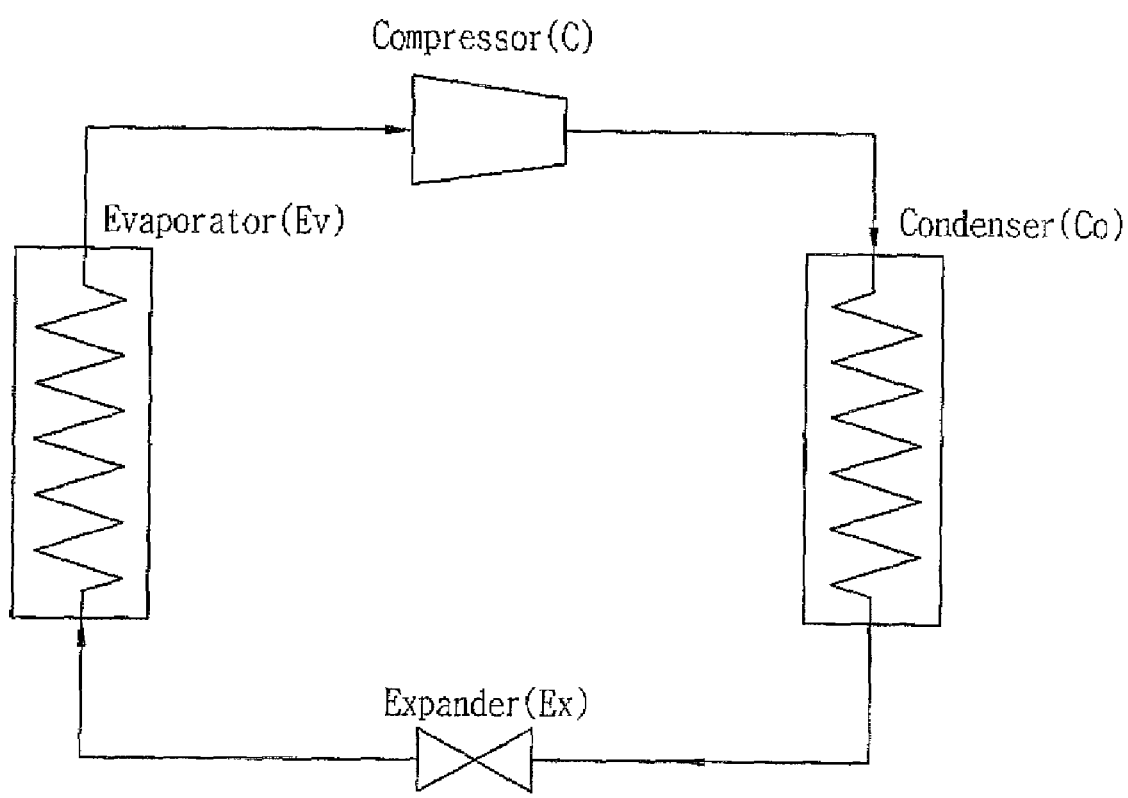
FIG. 16 is a schematic drawing of a refrigerating cycle of the refrigerator of FIG. 15.

For example, the reciprocating compressor according to embodiments disclosed herein may be employed in a refrigerator, such as the refrigerator 300 shown in FIG. 15 including reciprocating compressor C and having a refrigerating cycle as shown in FIG. 16.

Embodiments disclosed herein provide a reciprocating motor and a reciprocating compressor having the same, capable of minimizing a leakage of flux generated in air gaps between an outer core and inner core of the reciprocating motor and also greatly reducing fabricating costs thereof. Further, embodiments disclosed herein provide a reciprocating motor and a reciprocating compressor having the same, capable of reducing a length of a magnet while maintaining efficiency of the motor. Embodiments disclosed herein further provide a reciprocating motor and a reciprocating compressor having the same, capable of drastically reducing a size of the motor, as well as increasing productivity due to a facilitated operation of winding a coil.

Embodiments disclosed herein provide a reciprocating motor that may include a stator having a coil mounted at one side of an outer core or an inner core, and a mover having a magnet reciprocating by a magnetic field of the stator. The outer and inner cores may be connected to each other at one side of the stator in an axial direction based upon the coil, while being spaced apart from each other at another side thereof in the axial direction based upon the coil so as to form an air gap in which the magnet reciprocates.

Embodiments disclosed herein further provide a reciprocating compressor that may include a frame supported inside a hermetic container, a reciprocating motor including a stator fixed to the frame, formed to have a certain air gap between outer and inner cores, and having a coil disposed to form a magnetic field at one of the cores, and a magnet holder configured to support a magnet disposed in the air gap of the stator and perform a reciprocating motion, a cylinder supported at the frame, a piston configured to reciprocate with being inserted in the cylinder and coupled to the magnet holder, so as to compress a refrigerant, and springs disposed between front and rear side surfaces of the piston and the corresponding frame so as to elastically support the piston. One side of the outer and inner cores of the stator may be connected to each other based upon the coil to form the magnetic path, and another side thereof may be spaced apart from each other to form the air gap.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A reciprocating motor, comprising:
a stator having a wound coil, which is mounted in a coil mounting groove, an outer core, and an inner core; and
a mover having at least one magnet that reciprocates due to a magnetic field of the stator, wherein one side end portion of an inner circumferential surface of the outer core and one side end portion of an outer circumferential surface of the inner core of the stator are connected to each other at one side end portion of the coil in an axial direction of the stator, thereby forming a connection portion, and another side end portion of the inner circumferential surface of the outer core and another side end portion of the outer circumferential surface of the inner core of the stator are spaced apart from each other at another side end portion of the coil in the axial direction of the stator, thereby forming an air gap portion therebetween in which the at least one magnet reciprocates.

2. The reciprocating motor of claim 1, wherein the coil is mounted in the outer core.

3. The reciprocating motor of claim 1, wherein the outer and inner cores are welded to each other.

4. The reciprocating motor of claim 1, further comprising a plurality of supporting members, which are disposed at both ends of the outer and inner cores with respect to the axial direction, respectively, the plurality of supporting members being coupled to each other by coupling members that penetrate the plurality of supporting members and the outer core in the axial direction.

5. The reciprocating motor of claim 4, wherein the outer and inner cores each comprises a stepped portion by which they are coupled together at the connection portion.

6. The reciprocating motor of claim 5, wherein the connection portion is within a range of a half of a radius of a corresponding one of the supporting members with respect to the inner core.

7. The reciprocating motor of claim 4, wherein at least one of the plurality of supporting members is formed of a magnetic substance.

8. The reciprocating motor of claim 1, wherein the inner and outer cores are formed by laminating together a plurality of stator sheets sheet by sheet.

9. The reciprocating motor of claim 8, wherein inner circumferential side surfaces of the plurality of stator sheets contact each other.

10. The reciprocating motor of claim 1, wherein at least one end of the at least one magnet is disposed within the air gap.

11. The reciprocating motor of claim 1, wherein the at least one magnet is formed to be longer than a length of the air gap in the axial direction.

12. The reciprocating motor of claim 1, wherein the at least one magnet comprises a plurality of magnets disposed adjacent to one another in the axial direction.

13. The reciprocating motor of claim 12, wherein the plurality of magnets is disposed such that opposite polarities alternate.

14. The reciprocating motor of claim 13, wherein the plurality of magnets are disposed in a first column of magnets and a second column of magnets, such that polarities of inner and outer circumferential surfaces of the first column of magnet are respectively opposite to polarities of inner and outer circumferential surfaces of the second column of magnet.

15. The reciprocating motor of claim 1, wherein:
the outer core forms a first magnetism path and includes a coil mounting portion in which the coil is mounted;
the inner core forms a second magnetism path located inside the first magnetism path;
the connection portion forms a magnetism path connecting portion that connects the first magnetism path to the second magnetism path at the one side end portion thereof with the air gap portion at the other side end portion thereof; and
pole portions are respectively formed at an end portion of the first magnetism path adjacent the air gap portion and at a corresponding end portion of the second magnetism path facing the end portion of the first magnetism path.

16. The reciprocating motor of claim 15, wherein the pole portions have an inclined outer surface such that a cross section thereof is enlarged toward an end thereof.

17. A reciprocating compressor, comprising:

at least one frame supported inside a hermetic container;

a reciprocating motor including a stator fixed to the at least one frame, the stator comprising:
- inner and outer cores having an air gap portion formed therebetween;
- a wound coil configured to form a magnetic field, wherein the coil is mounted in a coil mounting groove; and
- a magnet holder configured to support at least one magnet disposed in the air gap portion that performs a reciprocating motion;

a cylinder supported on the at least one frame;

a piston configured to reciprocate within the cylinder and coupled to the magnet holder, so as to compress a refrigerant; and a plurality of springs that elastically supports the piston at front and rear portions, respectively, thereof, wherein one side end portion of an inner circumferential surface of the outer core and one side end portion of an outer circumferential surface of the inner core of the stator are connected to each other at one side end portion of the coil in an axial direction of the stator, thereby forming a connection portion, and another side end portion of the inner circumferential surface of the outer core and another side end portion of the outer circumferential surface of the inner core of the stator are spaced apart from each other at another side end portion of the coil in the axial direction of the stator, thereby forming the air gap portion therebetween.

18. The reciprocating compressor of claim 17, wherein at least one of the frame, the magnet holder, the cylinder, the piston, and the plurality of springs is formed of a magnetic substance.

19. The reciprocating compressor of claim 17, wherein the cylinder is disposed at least partially within the stator extending in the axial direction.

20. The reciprocating compressor of claim 17, wherein the at least one frame comprises first and second frames and the stator is fixedly inserted between the first and second frames.

21. The reciprocating compressor of claim 20, wherein the first and second frames and the stator are connected by a bolt that extends through the first and second frames and an outer core of the stator and a plurality of nuts.

22. The reciprocating compressor of claim 17, wherein the at least one frame comprises first and second frames and wherein the cylinder is attached to one of the first and second frames, and the stator is mounted on the cylinder.

23. The reciprocating compressor of claim 17, further comprising a spring supporter coupled to the magnet holder and the piston, where wherein the plurality of springs is installed at both sides of the spring supporter, respectively.

24. The reciprocating compressor of claim 23, wherein the spring supporter is formed of a magnetic substance.

25. The reciprocating compressor of claim 17, wherein the plurality of springs comprise first and second springs.

26. The reciprocating compressor of claim 25, wherein the first spring extends between a rear end of the cylinder and a rear flange of the piston, and the second spring extends between a rear surface of the magnet holder and a back cover.

27. The reciprocating compressor of claim 17, wherein the cylinder is formed of cast iron.

28. The reciprocating compressor of claim 17, further comprising a suction valve and a discharge valve formed of a magnetic substance.

* * * * *